J. G. Page.
Cotton Gin.
Nº 51,745.     Patented Dec. 26, 1865.
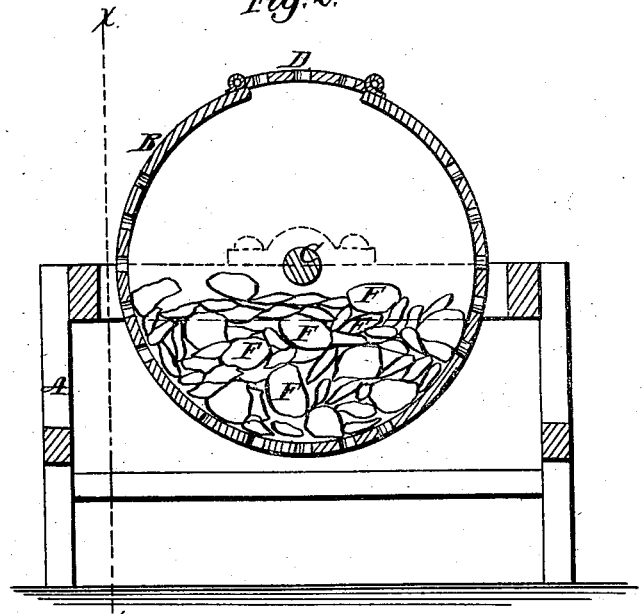
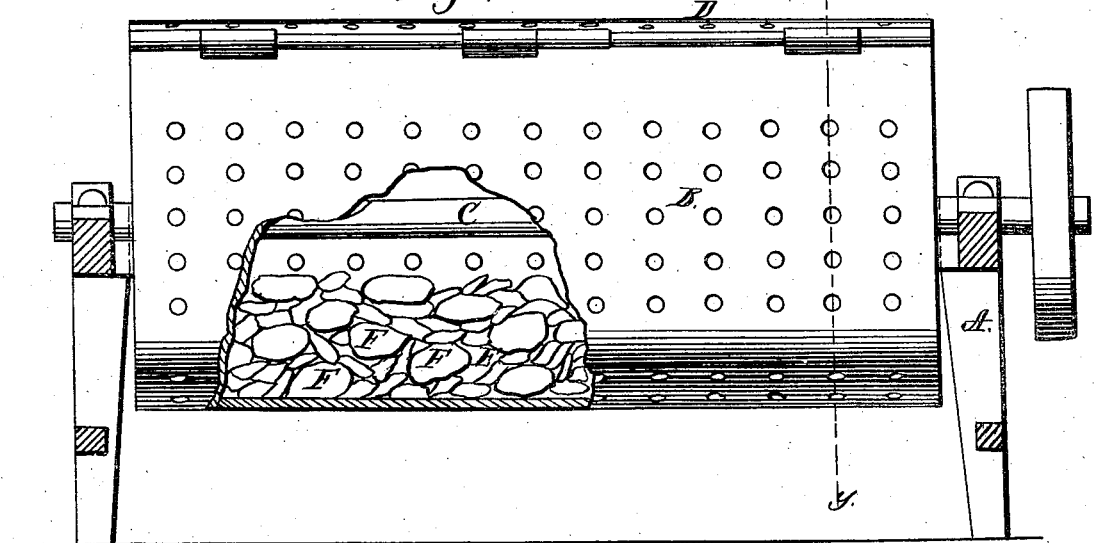
Witnesses:
Inventor:
Jno G Page

UNITED STATES PATENT OFFICE.

JOHN G. PAGE, OF ROCKFORD, ILLINOIS.

IMPROVEMENT IN PROCESSES FOR CLEANING COTTON-SEED.

Specification forming part of Letters Patent No. 51,745, dated December 26, 1865.

*To all whom it may concern:*

Be it known that I, JOHN G. PAGE, of Rockford, in the county of Winnebago and State of Illinois, have invented a new and useful Process for Cleaning Cotton-Seed; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2, a portion of the cylinder being broken away; Fig. 2, a transverse vertical section of the same, taken in the line $y\ y$, Fig. 1.

Similar letters of reference indicate corresponding parts.

Many attempts have been made to plant cotton-seed by a machine, but none have hitherto succeeded, the fine lint which adheres to the seed causing the latter to stick together and preventing them from being properly distributed or discharged from a seed box or hopper.

The object of my invention is to obtain a simple and inexpensive means for depriving the seed of its lint, so that the former will have a perfectly smooth exterior, and be capable of being planted with a machine in equally as perfect a manner as corn or other seed. To this end I use a perforated revolving cylinder, in which the cotton-seed is placed with small pebbles, stones, or other hard material a trifle larger than the seed, the attrition produced by the action of the seed and hard substances against each other as the cylinder rotates effectually depriving the seed of its lint.

A represents a framing, constructed in any proper manner to support a horizontal rotating cylinder, B, which may be constructed of sheet metal perforated with holes, and secured to proper heads through which the shaft C passes, or constructed in any other way, so as to be durable, and admit of holes or perforations being made in its periphery or exterior. This cylinder is provided with a door or removable section, D, which is also perforated. The cotton-seed E is placed within the cylinder B by removing the door or section D, and small pebbles F or other hard substances a trifle larger than the seed are also placed within the cylinder and the door or section D then secured to it and the cylinder rotated by hand or other power. The seed is deprived of its lint by the attrition caused by the pebbles or hard substances brought in contact with it, the fine particles rubbed off from the seed escaping through the perforations of the cylinder.

Thus by this simple means the tedious process of planting cotton-seed by hand may be avoided and the work performed by a seeding-machine equally as well as the planting of corn or other seed.

I would remark that after the cotton-seed is cleaned or deprived of its lint it may be separated from the pebbles or other substances within the cylinder B by removing the door or section D and placing another on the cylinder with perforations sufficiently large to admit of the seed passing through them, but not the pebbles which are larger than the seed.

By rotating the cylinder a short time the seed may all be discharged from it.

Having thus described my invention, I claim as new and desire to secure by Letters Patent—

1. The process of cleansing cotton-seed or depriving the same of lint by placing the seed, with pebbles, stones, or other hard substances, within a rotating or moving vessel, so that the attrition produced by the contact of the moving seed and pebbles or other hard substances within the vessel will accomplish the end desired.

2. The perforating of the vessel containing the seed and the pebbles or other hard substances, and also the employment of a plurality of perforated doors or removable sections to the cylinder for the purpose of separating the fine foreign substances from the seed while the latter is being cleansed or deprived of its lint, and also for separating the cleansed seed from the pebbles.

JOHN G. PAGE.

Witnesses:
C. N. ANDREWS,
SILAS G. TYLER.